May 4, 1954  C. N. BEBINGER  2,677,476
BELT CARRIER TRUCK
Filed Dec. 17, 1948  6 Sheets-Sheet 1

Inventor:
by Charles N. Bebinger
John F. Schmidt
Attorney.

May 4, 1954     C. N. BEBINGER     2,677,476
BELT CARRIER TRUCK

Filed Dec. 17, 1948     6 Sheets-Sheet 2

Inventor:
Charles N. Bebinger
by John F. Schmidt
Attorney.

May 4, 1954     C. N. BEBINGER     2,677,476
BELT CARRIER TRUCK

Filed Dec. 17, 1948     6 Sheets-Sheet 3

Inventor:
Charles N. Bebinger
by John F. Schmidt
Attorney.

May 4, 1954  C. N. BEBINGER  2,677,476
BELT CARRIER TRUCK
Filed Dec. 17, 1948  6 Sheets-Sheet 4
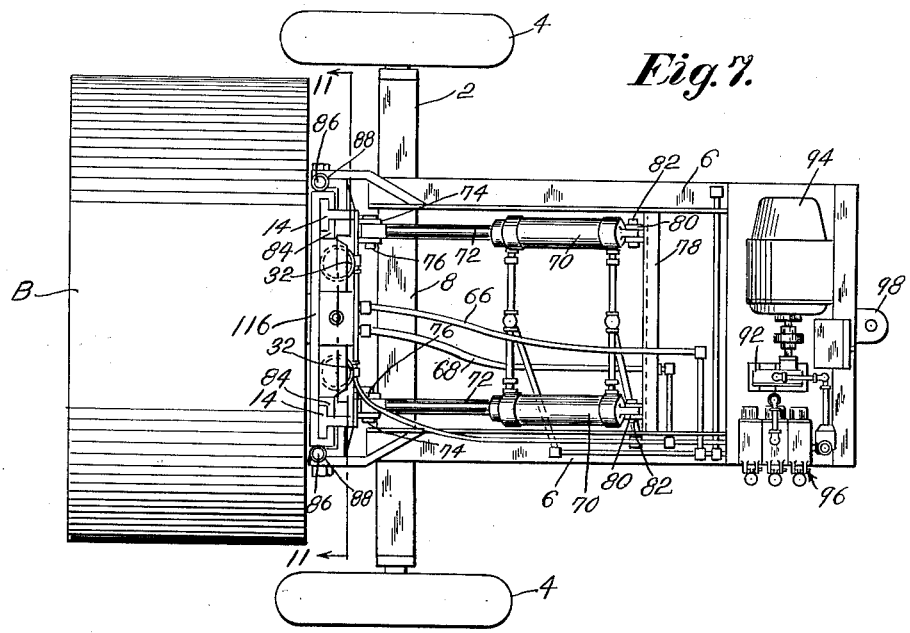
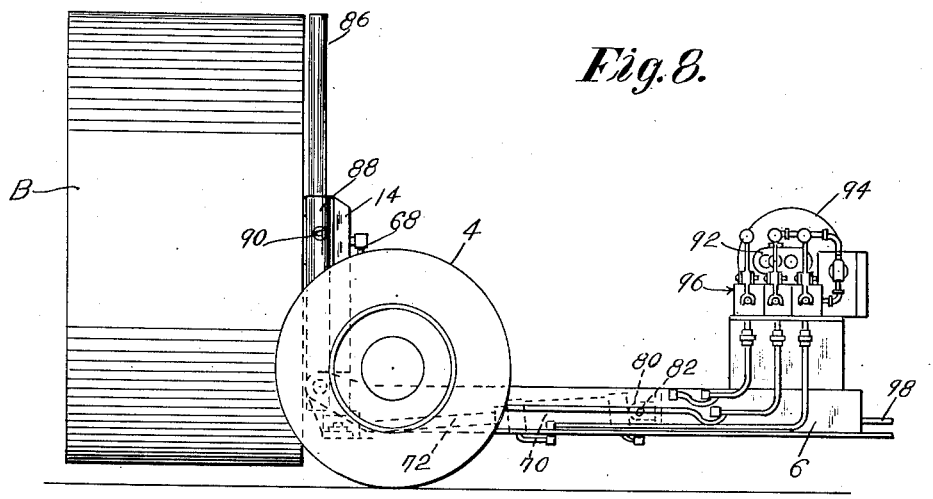
Inventor:
Charles N. Bebinger.
by John F. Schmidt
Attorney.

May 4, 1954    C. N. BEBINGER    2,677,476
BELT CARRIER TRUCK
Filed Dec. 17, 1948    6 Sheets-Sheet 5
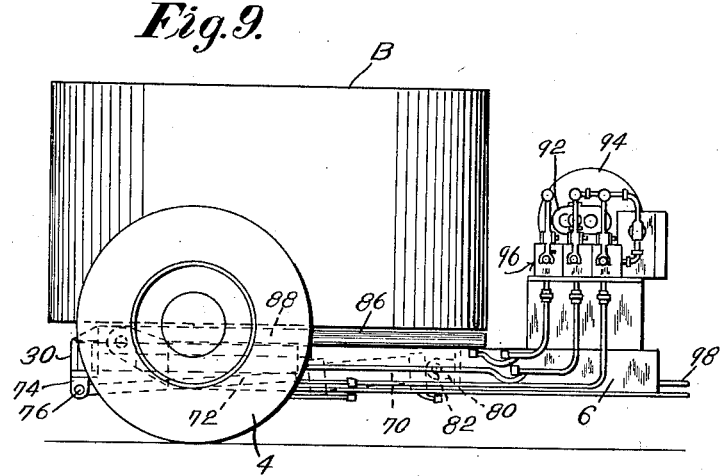
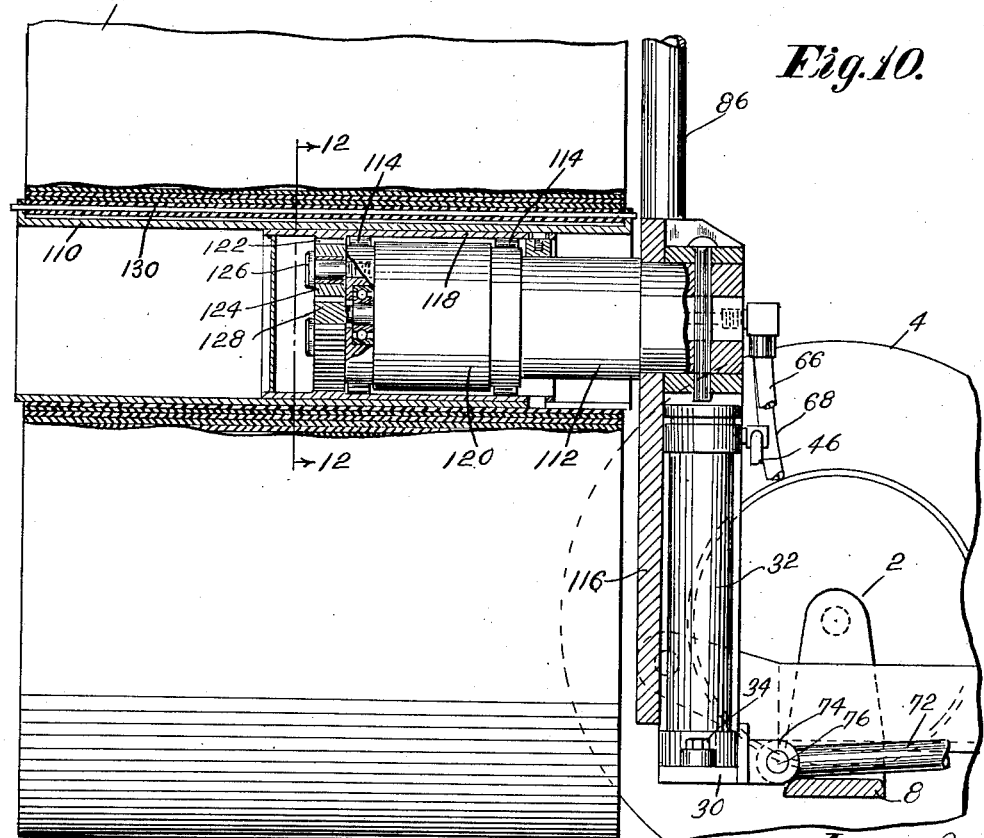
Inventor:
Charles N. Bebinger
by John F. Schmidt
Attorney.

May 4, 1954
C. N. BEBINGER
2,677,476
BELT CARRIER TRUCK
Filed Dec. 17, 1948
6 Sheets-Sheet 6
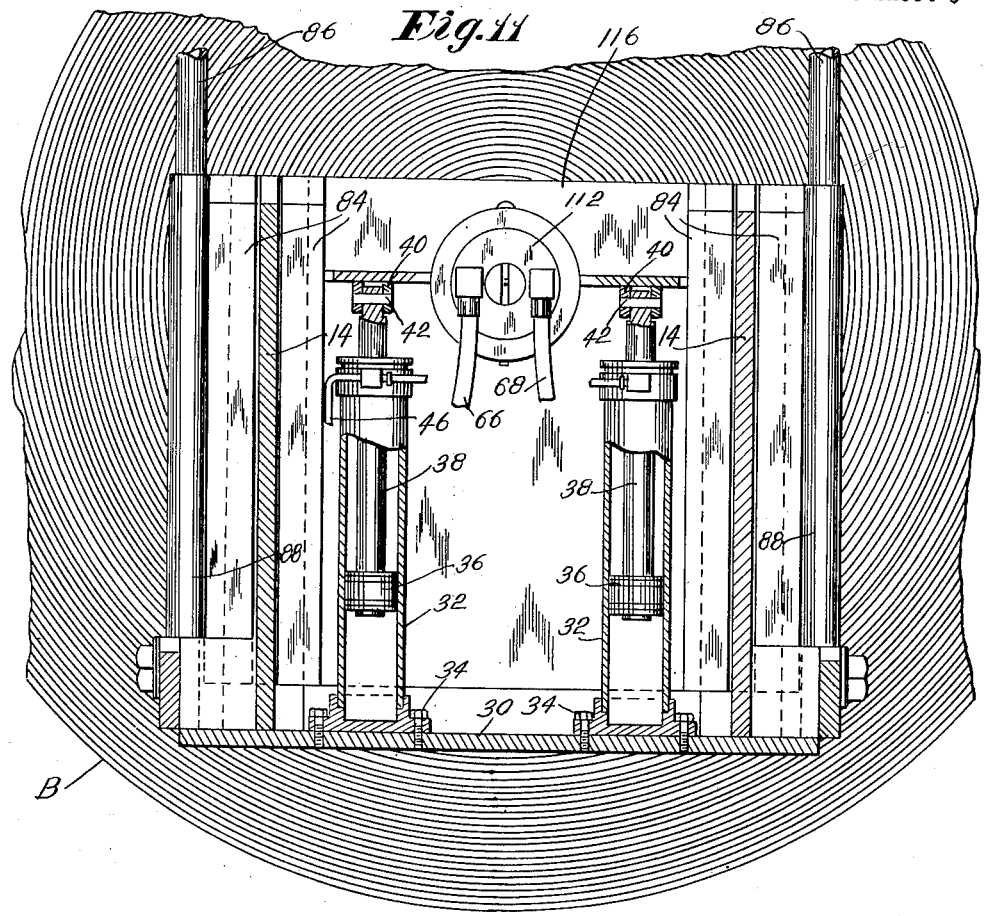
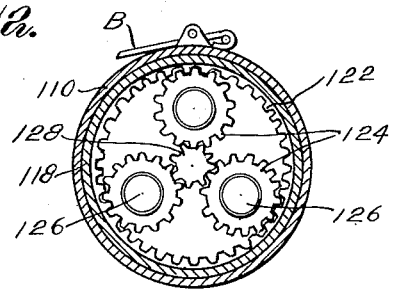
Inventor:
Charles N. Bebinger.
by John F. Schmidt
Attorney.

Patented May 4, 1954

2,677,476

UNITED STATES PATENT OFFICE 2,677,476

BELT CARRIER TRUCK

Charles N. Bebinger, New Philadelphia, Ohio, assignor to Joy Manufacturing Company, Pittsburgh, Pa., a corporation of Pennsylvania Application December 17, 1948, Serial No. 65,914

14 Claims. (Cl. 214—660)

This invention relates to a belt carrier, especially such a belt carrier as might be used in mines to transport and wind or unwind the belt of a belt conveyor.

Mining machinery today involves the extensive use in many applications of belt conveyors. When a conveyor line is set up in a mine, it is necessary to move a belt into the mine to the site of the conveyor and there to put the belt in place on the conveyor. This operation is often tedious and difficult due to the weight of the belt. The low working space allowed in seams of not very great thickness and the other usual, difficult conditions obtaining underground need not be detailed to those skilled in the art. When the conveyor is knocked down to be transported elsewhere, this process must be reversed and the belt must be put in some condition for transporting to a new site, a preferred condition being a completely wound belt, which is difficult to accomplish with equipment now in use.

It is an object of this invention to provide a device which is easily maneuvered in and out of mines, particularly mines having low seams. It is another object to provide a device which is capable of taking a belt which is spread out on the ground or mine bottom and of winding the belt up in a conveniently handled roll; of transporting the roll about to another part of the mine or out of the mine, and either depositing it for storage in its rolled up condition or transporting it to another site where it is to be used, and unwinding it at such other site.

These and other objects are accomplished in a device which is capable of picking up a rolled-up belt, rotating the axis of the belt to a vertical position, if necessary, to reduce the overall height of the loaded device, and transporting the belt to another site; which permits easy unrolling of the belt; and which enables quick and easy disassembly of a conveyor and rolling up of the belt. The device includes a mobile support and a belt spindle pivotably carried on the support, the spindle having translatory movement relative to the support in order that the rolled-up belt may be lifted off the ground or deposited on the ground.

In the drawings:

Fig. 7 is a top plan view of another embodiment of the invention.

Fig. 8 is a side elevation of the embodiment shown in Fig. 7.

Fig. 9 is a side elevation similar to Fig. 8 but showing the belt axis in the vertical position to reduce the overall height of the loaded device.

Fig. 10 is an enlarged side elevation, with parts broken away and in section.

Fig. 11 is a view in section substantially on line 11—11 of Fig. 7.

Fig. 12 is a view in section on line 12—12 of Fig. 10.

Figure 1:
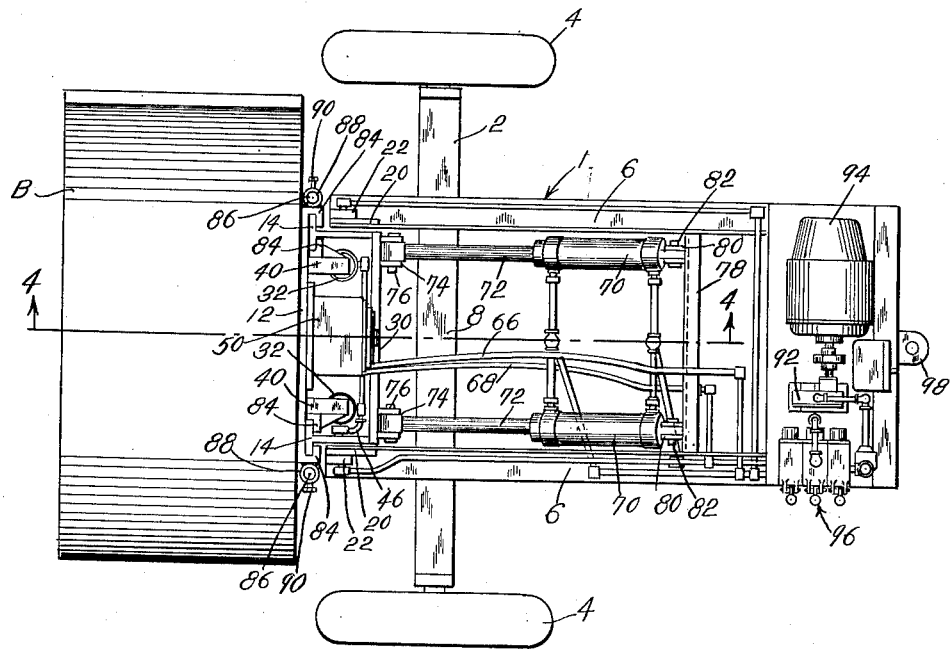
Fig. 1 is a top plan view of one embodiment of a device made according to the invention.
Figure 2:
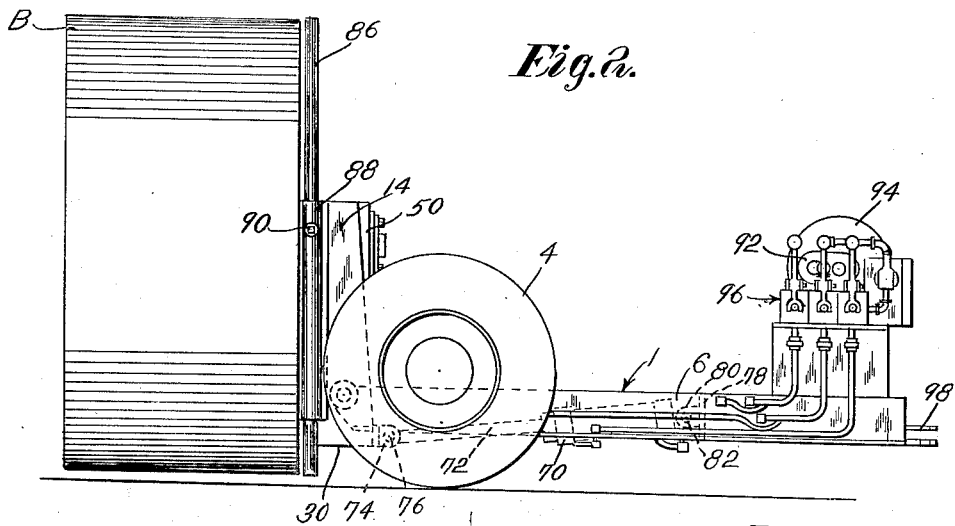
Fig. 2 is a side elevation view of the device shown in Fig. 1.

Referring first specifically to the embodiment shown in Figs. 1 to 6 inclusive, there is shown a mobile support 1 which may and preferably does comprise an axle 2 mounted on wheel 4; and a pair of side frame members 6, 6 mounted on and carried by the axle 2. The side frame members 6, 6 are preferably made of angle stock as can best be seen in Fig. 5. The axle 2 includes a drop-center portion 8 (Fig. 4) which is lower than that portion of the axle to which the side frame members 6 are secured, in order to provide clearances for certain of the operating mechanism to be described in detail hereinafter.

A belt spindle 10 is rotatably carried by a spindle carrier 12 which is preferably in the form of a flat plate. The spindle 10 is carried by the support described above and is pivotable relative to the support as well as having translatory movement relative thereto.

Describing first in detail the means for mounting the belt spindle for pivotal movement relative to the support, note that there are two rail members 14, 14, preferably T-shaped, as best seen in Fig. 1, mounted to pivot on the side frame members 6, 6 by means of pivots indicated generally by 16 and 18. Each of the pivots 16 and 18 preferably consists of a reinforcing plate 20 secured as by welding to the upright leg of the angle forming the side frame member 6, and a reinforcing sleeve 22 secured as by tack welding. The outer ends of the sleeves 22 are flanged inward as shown at 24, in order to retain a sleeve bearing 26 in which the pivot axle 28 rotates. Pivot axle 28 is preferably threaded into the leg of the T member 14.

A transverse member 30 is secured as by welding to the lower ends of the rail members 14 and forms a platform which by virtue of its connection to the rail members is pivotally carried by the support. The belt spindle 10 is also mounted for translatory movement relative to the support, more specifically relative to the platform 30. This translatory movement is preferably effected by hydraulic means consisting of a cylinder and a piston reciprocable therein, one of which is mounted on the platform and the other of which is connected to move the spindle relative to the platform. The translatory movement referred to provides a selectively variable distance of the spindle axis from the platform.

In the embodiment shown, a hydraulic cylinder 32 is mounted at or near each end of the transverse member or platform 30 by any suitable means such as threaded members 34. A piston 36 is mounted for reciprocation in each cylinder 32. To each piston, one end of a piston rod 38 is connected, the other end of which extends through any suitable packing, not shown, in the upper end of cylinder 32 and is connected to a lug 40 secured to the spindle carrier 12. The connection of piston rod 38 to the lug 40 may be by any suitable means well known in the art, as for example by a pin 42 extending through the sides of the lug and through the piston rod.

The two cylinders 32 are preferably of the double-acting type, and pressure fluid for the upper ends of the cylinders passes through a connection 44 in the pivot 16. A fluid conduit 46 conducts fluid under pressure from the connection 44 to the upper ends of the cylinders 32. Fluid for the lower ends of the cylinders passes through a connection 48 in the pivot 18 and thence to a suitable pressure fluid conduit, not shown.

A gear casing 50 is firmly secured to the spindle carrier 12. In the gear casing 50 a bevel gear 52 is mounted for rotation in an antifriction bearing 54. The spindle 10 passes through the center of gear 52 and is keyed thereto as shown at 56. Spindle 10 is thus supported by gear 52 and bearing 54, and in addition by another antifriction bearing 58 mounted in the gear casing 50.

A bevel pinion 60 meshes with gear 52 and is keyed to a shaft 62 of a pressure fluid motor 64. Conduits 66 and 68 are provided to conduct pressure fluid to and from the motor 64.

Reference was made above to the pivot of platform 30 on the support, and the pivots 16 and 18 have been described in detail. Means to pivot the belt spindle relative to the support are provided. These means preferably consist of pressure fluid means such as double-acting hydraulic cylinders 70 having pistons (not shown) and piston rods 72 connected to ears or lugs 74 on platform 30 by means of pins 76. The cylinders 70 are mounted on a cross member 78 by means of ears 80 and pins 82.

The T-shaped rail members 14 are adapted to reciprocate in elongated guides 84 which may be formed by welding appropriate bar stock to the spindle carrier 12. In order to prevent coning of the belt when its axis is turned from the horizontal position shown in Fig. 2 to the vertical position shown in Fig. 3, a bar or rod 86 is mounted in an elongated socket 88. Two such rods and sockets are preferably provided. The sockets 88 are mounted on the guides 84 at opposite sides of the spindle carrier, and are provided with set screws 90 to permit vertical adjustment of the bars 86.

Pressure fluid is supplied to the pivot cylinders 70 and the translatory motion cylinders 32 by means of any suitable pump 92, preferably driven by an electric motor 94. Fluid is supplied to the various cylinders by appropriate conduits through a control mechanism indicated generally at 96. Inasmuch as the construction and operation of pressure fluid mechanism is well understood by those skilled in the art, and further inasmuch as the invention herein does not reside in details of such mechanism, those details will not be set forth herein.

The forward end of the support is provided with a short tongue 98 to permit its connection to a suitable prime mover.

Figs. 7 to 12 inclusive show another embodiment of the invention, the principal difference between which and the foregoing consists in the arrangement of the pressure fluid drive motor for the belt spindle. Inasmuch as the details of the support are substantially the same in principle as in the foregoing embodiment, no attempt will be made here to describe those details anew. Instead, the description of this additional embodiment will be largely limited to those features thereof which differ from the first embodiment.

Under certain circumstances it will be desirable to obtain a lower overall height than is possible with the embodiment shown in Figs. 1 to 6 inclusive. This can be effected by mounting the spindle drive motor inside the belt spindle, as is done in the embodiment shown in Figs. 7 to 12 inclusive. In this embodiment, a belt spindle 110 is shown as being rotatable on a spindle support 112 by means of antifriction bearings 114. Spindle support 112 is securely mounted on spindle carrier 116. The bearings 114 are mounted between a motor housing 118 and a hydraulic motor 120. The motor housing 118 is mounted directly inside the spindle 110, and integral with the motor housing there is an internal gear 122; see especially Fig. 12. Planetary gears 124 are mounted on stub shafts 126 and mesh with the internal gear 122 and with a sun gear 128. The sun gear 128 is directly connected to or mounted on the drive shaft of hydraulic motor 120.

*Operation*

In using a belt carrier made according to this invention, the device is coupled to a suitable prime mover and is run up to a belt B resting on the ground with its axis in a horizontal position. The belt spindle is lowered by supplying fluid under pressure to the upper ends of cylinders 32 until the axis of the belt spindle is on a level with the axis of the belt. The device is then moved to introduce the belt spindle into the belt as far as possible whereupon fluid under pressure is admitted to the lower ends of cylinders 32 to lift the belt off the ground, mine bottom, or other support upon which it may be resting.

Figure 3:
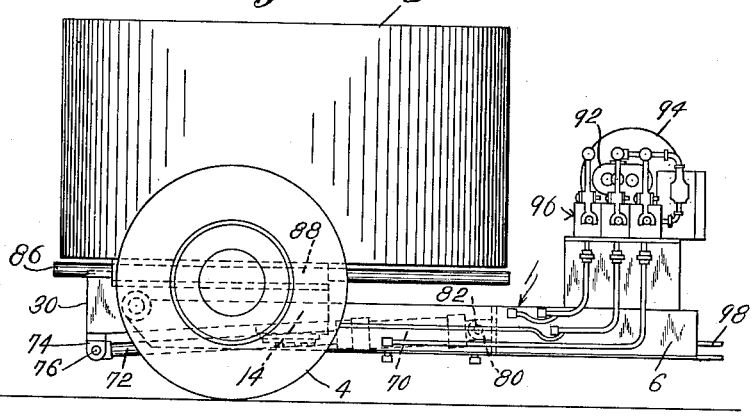
Fig. 3 is a side elevation similar to Fig. 2 but showing the device with the belt axis rotated to a vertical position in order to reduce the overall height of the loaded device.
Figure 4:
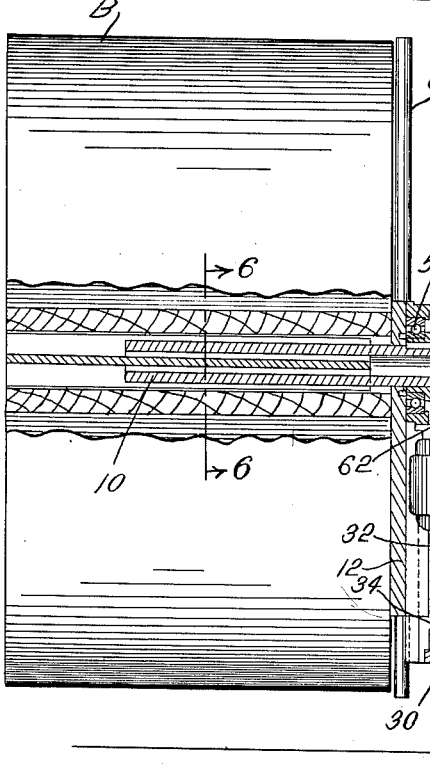
Fig. 4 is a view in section on line 4—4 of Fig. 1.
Figure 5:
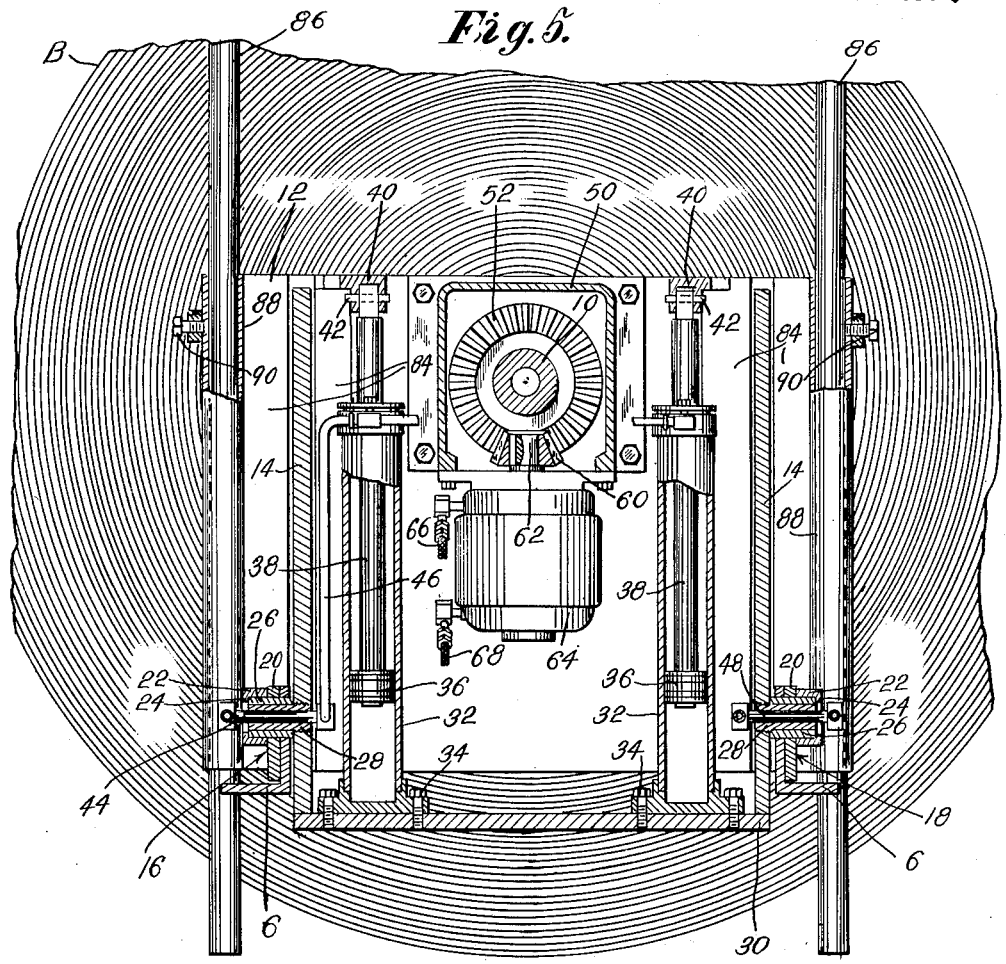
Fig. 5 is a view in section substantially on line 5—5 of Fig. 4.
Figure 6:
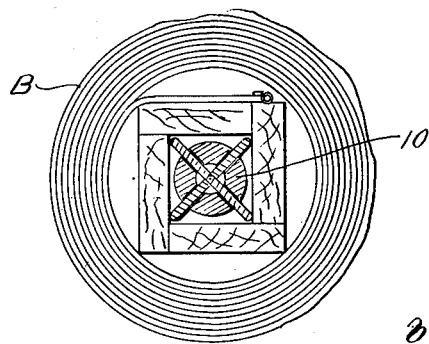
Fig. 6 is a view in section on line 6—6 of Fig. 4.

If the belt is to be moved into a mine having a low seam, the belt axis may be turned 90° to a vertical position by admitting fluid under pressure to the right ends of cylinders 70 whereupon the belt will be turned to the position shown in Figs. 3 and 9. The belt is thus transported to a desired site, as for example a place of storage. If the belt is to be stored, it is again turned to put its axis into a horizontal position whereupon it is lowered to the ground or other support by admitting fluid under pressure to the upper ends of cylinders 32. If the belt is transported to the site of a belt conveyor which is to be set up, the belt axis is turned to the horizontal position and with the axis in this position and with the belt off the ground, the belt is unwound from the spindle by rotation of the spindle by the spindle drive motor in a manner which will be well understood by those skilled in the art and need not be described in detail herein.

A belt carrier made according to this invention can be conveniently used to completely knock down a belt conveyor or to shorten a belt conveyor as may be desired. If it is desired to shorten the conveyor, the belt is disconnected at one of the splices and the upper run of the belt is clamped to the conveyor boom, and the return run of the belt is attached to the belt spindle 110 (see Fig. 10) by means of a rod 130 which acts as a fastener. The belt conveyor drive is then reversed so that the pulley and belt spindle of the invention are both working in series, pulling on the return run of the belt. The tailpiece is pulled along with the belt and the intermediate sections are taken out of position, to be hauled out with a shuttle car. With the conveyor out 2,000 feet, this operation takes considerable pull to pull the belt and the tailpiece, and for that reason it is desirable to use the conveyor tandem drive in series with the spindle drive of the invention to pull the belt and tailpiece along. As will be well understood by those skilled in the art, where it is desired to take down the entire conveyor rather than shorten the conveyor, the entire length of belt will be wound up on the spindle as aforesaid.

It will be evident to those skilled in the art that this invention provides a convenient means for readily handling a conveyor belt and transporting it about from place to place; that this invention provides means for assisting in shortening a belt conveyor where that is desired; and that the invention provides a device for the easy and ready disassembling of a belt conveyor, providing means to roll up the belt for ready transportation to storage or to a new site of assembly of the belt conveyor. The device even when loaded with a rolled up belt has a low overall height and permits handling of the belt with a minimum of manual labor. Other advantages will be apparent to those skilled in the art.

While there are in this application specifically described two forms which the invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. In combination, a support, a platform carried by the support and pivotable through substantially 90° about a given axis relative to the support, means to move the platform pivotally relative to the support, a belt spindle mounted on the platform with its axis lying in a plane substantially perpendicular to the given axis and having a selectively variable axis distance from the platform, and means to effect translatory movement of said spindle relative to the platform to vary the distance of the spindle axis from the platform.

2. The combination set forth in claim 1, and means to rotate the spindle.

3. The combination set forth in claim 1, and fluid operated mechanism connected to the support and the platform to effect the pivotal movement.

4. The combination set forth in claim 1, in which the support comprises an axle, and a pair of side frame members.

5. The combination set forth in claim 1, in which the belt spindle is mounted on a spindle carrier; guide means associated with the spindle carrier, and rails mounted on the platform and cooperating with the guide means.

6. The combination set forth in claim 1, and rails pivotally secured to the support to provide said means to pivot the platform.

7. The combination of claim 1, in which the last-named means includes a telescoping rail and guide mechanism.

8. A mobile support, a platform carried by the support and pivotably mounted thereon, means to pivot the platform relative to the support, a belt spindle carried by the platform, means to mount the spindle for translatory movement relative to the platform to vary the distance of the spindle axis from the platform, and fluid pressure means connected to effect said translatory movement.

9. In the combination set forth in claim 8, a pair of pivots for mounting the platform on the support, and fluid passage means through the pivots forming part of the fluid pressure means.

10. The combination set forth in claim 9, in which the fluid pressure means includes a cylinder and a piston reciprocable therein.

11. The combination set forth in claim 8, in which the fluid pressure means includes a cylinder and a piston reciprocable therein.

12. The combination set forth in claim 8, in which the fluid pressure means includes a cylinder and a piston reciprocable therein, one of which is mounted on the platform and the other of which is connected to effect the translatory movement of the spindle relative to the platform.

13. A support, a platform carried by the support and pivotably mounted thereon, means to pivot the platform relative to the support, a belt spindle carried by the platform, means to mount the spindle for translatory movement relative to the platform to vary the distance of the spindle axis from the platform, and means disposed within the spindle to drive the spindle.

14. A support, a plurality of rails carried by the support and pivotally secured thereto, a platform carried by the rails, means to pivot the rails relative to the support through substantially 90°, a spindle carrier, guide means associated with the spindle carrier and cooperating with the rails, a belt spindle mounted on the spindle carrier, and means to impart translatory movement of the spindle carrier relative to the platform to vary the distance of the spindle axis from the platform.

References Cited in the file of this patent

UNITED STATES PATENTS

| Number | Name | Date |
|---|---|---|
| 1,429,004 | Wick | Sept. 12, 1922 |
| 1,528,284 | Williamson | Mar. 3, 1925 |
| 1,868,562 | Chubb et al. | July 26, 1932 |
| 2,193,765 | Krengel | Mar. 12, 1940 |
| 2,214,176 | Portle | Sept. 10, 1940 |
| 2,216,697 | Vossenberg | Oct. 1, 1940 |
| 2,281,004 | Lehmann et al. | Apr. 28, 1942 |
| 2,391,321 | Littell | Dec. 18, 1945 |
| 2,396,161 | Cullen | Mar. 5, 1946 |
| 2,469,644 | Harrison | May 10, 1949 |
| 2,506,881 | Ligler | May 9, 1950 |